US012052381B1

(12) United States Patent
Okezie

(10) Patent No.: US 12,052,381 B1
(45) Date of Patent: *Jul. 30, 2024

(54) SAFETY APPARATUS AND METHOD

(71) Applicant: Pathfins C. Okezie, Piscataway, NJ (US)

(72) Inventor: Pathfins C. Okezie, Piscataway, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/604,657

(22) Filed: Mar. 14, 2024

(51) Int. Cl.
G08G 1/09 (2006.01)
B60R 1/20 (2022.01)
B60R 1/23 (2022.01)
H04M 1/60 (2006.01)

(52) U.S. Cl.
CPC ............ H04M 1/6091 (2013.01); B60R 1/23 (2022.01)

(58) Field of Classification Search
CPC ......... H04M 1/6091; G06F 3/165; B60R 1/23
See application file for complete search history.

(56) References Cited

U.S. PATENT DOCUMENTS

| 5,041,828 | A | 8/1991 | Loeven |
| 5,973,618 | A | 10/1999 | Ellis |
| 6,437,690 | B1 | 8/2002 | Okezie |
| 6,985,827 | B2 | 1/2006 | Williams |
| 7,167,104 | B2 | 1/2007 | DiPiazza |
| 7,697,028 | B1 | 4/2010 | Johnson |
| 7,880,601 | B2 | 2/2011 | Okezie |
| 8,134,693 | B2 | 3/2012 | Ciolli |
| 8,817,100 | B2 | 8/2014 | Nerayoff |
| 9,129,540 | B2 | 9/2015 | Jones |
| 9,327,685 | B1 | 5/2016 | Wooten |
| 9,940,524 | B2 | 4/2018 | Krishnamoorthy |
| 10,229,588 | B2 | 3/2019 | Che |
| 10,347,107 | B1 | 7/2019 | Okezie |
| 10,407,853 | B1 | 9/2019 | Dunn |
| 10,453,322 | B2 | 10/2019 | Kaindl |
| 11,049,380 | B2 | 6/2021 | Kaindl |
| 11,423,749 | B2 | 8/2022 | Omata |
| 11,600,153 | B1 | 3/2023 | Okezie |
| 11,610,483 | B1 * | 3/2023 | Okezie ................ G08G 1/09 |
| 11,759,389 | B2 | 9/2023 | Stanfield |
| 11,771,151 | B2 | 10/2023 | Walker |
| 2004/0083031 | A1 | 4/2004 | Okezie |
| 2004/0145496 | A1 | 7/2004 | Ellis |

(Continued)

FOREIGN PATENT DOCUMENTS

KR 20210030060 A 3/2021

Primary Examiner — Jinsong Hu
Assistant Examiner — Farideh Madani
(74) Attorney, Agent, or Firm — Walter J. Tencza, Jr.

(57) ABSTRACT

A dashboard apparatus configured to detect a cell phone within a first range of the dashboard apparatus; to select at least one of a plurality of audio messages stored in a computer memory of the dashboard apparatus, and to play the at least one of the plurality of audio messages stored in the computer memory of the dashboard apparatus through an audio speaker of the dashboard apparatus. In addition, the cell phone may be configured to detect the dashboard apparatus within the first range of the cell phone; to select at least one of a plurality of audio messages stored in a computer memory of the cell phone, and to play the at least one of the plurality of audio messages stored in the computer memory of the cell phone through an audio speaker of the cell phone.

14 Claims, 7 Drawing Sheets

(56) References Cited

U.S. PATENT DOCUMENTS

| | | |
|---|---|---|
| 2006/0056086 A1 | 2/2006 | Hannah |
| 2006/0097855 A1 | 5/2006 | Turnbull |
| 2008/0103655 A1 | 5/2008 | Turnbull |
| 2009/0289443 A1 | 11/2009 | Okezie |
| 2014/0046800 A1 | 2/2014 | Chen |
| 2015/0127215 A1* | 5/2015 | Chatterjee .......... B60H 1/00642 701/1 |
| 2015/0160019 A1* | 6/2015 | Biswal .................. G06Q 50/01 701/1 |
| 2015/0258431 A1 | 9/2015 | Stafford |
| 2015/0351681 A1 | 12/2015 | Lee |
| 2016/0039424 A1 | 2/2016 | Hong |
| 2016/0317383 A1 | 11/2016 | Stanfield |
| 2017/0155997 A1 | 6/2017 | Boesen |
| 2017/0188077 A1 | 6/2017 | Cansino |
| 2017/0323569 A1 | 11/2017 | Willborn |
| 2018/0279032 A1 | 9/2018 | Boesen |
| 2019/0035267 A1 | 1/2019 | Balzer |
| 2019/0370562 A1 | 12/2019 | Yigit |
| 2020/0111352 A1 | 4/2020 | Openiano |
| 2020/0130569 A1 | 4/2020 | Lindsey |
| 2020/0189476 A1 | 6/2020 | Consolacion |
| 2021/0101483 A1 | 4/2021 | Okezie |
| 2021/0287512 A1 | 9/2021 | Kaindl |
| 2022/0044504 A1* | 2/2022 | Consolacion ...... G07C 9/00571 |
| 2022/0132946 A1 | 5/2022 | Walker |
| 2022/0281414 A1 | 9/2022 | Young |
| 2023/0316897 A1 | 10/2023 | Koga |

\* cited by examiner

SAFETY APPARATUS AND METHOD

FIELD OF THE INVENTION

This invention relates to vehicle safety apparatuses and methods.

BACKGROUND OF THE INVENTION

In the year 2020, 38,824 people died in motor vehicle accidents in the United States of America and in the year 2021, 42,915 people were killed in motor vehicle accidents in the USA. That is a 10.5% jump in motor vehicle fatalities from 2020 to 2021. This is not acceptable. We can do better or at least try to do better. We are all so vulnerable to motor vehicle accidents at any time here in the USA. The old saying that you can go out there and be run over by a car does not have to be true.

Civilian vehicles frequently improperly drive pass a school bus while a school bus stop sign is on display; and about one hundred and thirty-four school children have been killed within the past five years by civilian vehicles driving past a school bus while the school bus stop sign is displayed by the school bus operator. Moreover there have been about 1,620 school children that been put in harms' way by civilian vehicle operators trying to drive pass a school bus while the school bus driver is either dropping of picking up students while the stop sign on the side of the school bus is on display or activated. It is important to prevent current and future school children from being killed or run over by civilian vehicle operator/s failing to stop for our school buses at school bus stop while the school bus is either picking up or dropping school children at a school bus stop.

It is frequently important to get motorists to slow down when driving in local neighborhoods across the USA. There have been many fatalities, particularly of children, due to the frequent speeding by motorist in many local neighborhoods. As a result, many neighborhoods have banded together to express their frustrations to motorists speeding in their neighborhoods by posting signs with message such as "please slow down, no speeding in this neighborhood", but this has not proved to be sufficient to prevent accidents.

Recently there have been fatalities related to speeding electronic bike riders not stopping for pedestrians in crosswalks or even failing to stop on red stop lights. There are also incidents of accidents with pedestrians as a result of electronic and/or non-electronic bikes, scooters, or skateboarders speeding or failing to stop on a red traffic stop light.

A troubling trend in the USA is that recently some vehicle operators have illegally tampered with their license plate by changing or switching this vehicle plate license with the intent to commit a crime or to avoid paying tolls at toll booths when these fake license plates go thru any toll booth. The cameras at the toll booths are not able to match the vehicle identification number with the fake and illegal license plate. It is very important to stop this illegal trend before it goes out of control because cities and states are losing lots of money/revenue due to this illegal practice/behavior. Moreover, this illegal behavior makes it difficult or impossible for law enforcement officers to locate vehicles reported stolen.

Another traffic safety issue are accidents involving deer. Any vehicle operator which has run over a deer with their vehicle or has had a deer bump into their vehicle on the road/highways knows how expensive the repairs to his/her vehicle can be. Depending on the type of auto insurance, many auto insurance policies do not cover collisions with deer. There is a need for devices to reduce the number of accidents involving automobiles and deer.

Another traffic safety issue is children or adults being run over trying to buy ice cream or other foods from ice cream or food service trucks. Frequently a food truck service physical stop sign is activated and still vehicle operator/s will not obey the physical sign. There was one memorable incident of a child killed trying to buy food from an ice cream truck by a vehicle operator who did not yield to the stop sign on the side of the ice cream truck. This incident happened in 2021 in a small town called Wallingford in the State of Connecticut. This child's name was "Tristan Barhorst". The state of Connecticut passed Tristan Law in memory of Tristan. Tristan Law makes it a Connecticut state Law for every vehicle operator to come to a full stop whenever the physical stop sign on the side of a food service truck is displayed. However, this law is not enough to prevent accidents from occurring.

Generally, cell phone location finders with a home monitoring system/device, is known and referred to in U.S. Pat. No. 10,347,107 to Okezie, which is incorporated by reference herein. The old location finder in that patent, is based on a cell phone camera being connected to a home monitoring center, twenty-four hours a day, and this means that one's cell phone has to be turned on all the time. The problem with this design is the cell phone battery will be run down or die very quickly and the purpose of using the cell phone camera as a location finder or as a security guide or as a "guardian angel" is defeated. In addition, having the camera on any cell phone being turned on or staying on all the time, is against the cell phone's manufacturers recommendation. There is a need for better cell phone location finders, and a need to employ cell phone location finders for better purposes.

SUMMARY OF THE INVENTION

The present application incorporates by reference U.S. Pat. No. 11,610,483, titled: "SAFETY APPARATUS AND METHOD", issued on Mar. 21, 2023, inventor Pathfins C. Okezie, which is the same inventor for the present application.

In at least one embodiment, a method and/or apparatus is provided to reduce motor vehicle related traffic fatalities.

In at least one embodiment, an apparatus is provided comprising: a dashboard apparatus configured to be fixed to a motor vehicle comprising: a computer processor; a computer memory in communication with the computer processor of the dashboard apparatus through a communications link; a device for detecting a wrist band device with a first range of the dashboard apparatus, wherein the device for detecting a wrist band device is in communication with the computer processor of the dashboard apparatus through a communications link; and an audio speaker in communication with the computer processor of the dashboard apparatus through a communications links.

In at least one embodiment of the present application the computer memory of the dashboard apparatus includes computer software implemented by the computer processor of the dashboard apparatus to receive one or more signals from the device for detecting the wrist band device, and to select based on the one or more signals from the device for detecting the wrist band device at least one of a plurality of audio messages stored in the computer memory of the dashboard apparatus, and to play the at least one of the plurality of audio messages through the audio speaker of the dashboard apparatus.

The apparatus may include the wrist band device which may be comprised of: a computer processor; a computer memory in communication with the computer processor of the wrist band device through a communications link; a device for detecting the dashboard apparatus within a range of the wristband device, wherein the device for detecting the dashboard apparatus is in communication with the computer processor of the wristband device through a communications link; and an audio speaker in communication with the computer processor of the wristband device through a communications links.

In at least one embodiment, the computer memory of the wrist band device includes computer software implemented by the computer processor of the wristband device to receive one or more signals from the device for detecting the dashboard apparatus, and to select based on the one or more signals from the device for detecting the dashboard apparatus at least one of a plurality of audio messages stored in the computer memory of the wrist band device, and to play the at least one of the plurality of audio messages stored in computer memory of the wrist band device through the audio speaker of the wrist band device.

The device for detecting the wrist band device may include a camera and/or a scanner. The device for detecting the dashboard apparatus may include a camera and/or a scanner.

In at least one embodiment, the wrist band device includes a housing; wherein the device for detecting the dashboard apparatus include first, second, third, and four detection devices; wherein the first detection device is directed in a first direction with respect to the housing; wherein the second detection device is directed in a second direction with respect to the housing, which is opposite the first direction; wherein the third detection device is directed in a third direction with respect to the housing, which is at an angle of ninety degrees with respect to the first and second directions; and wherein the fourth detection device is directed in a fourth direction with respect to the housing, which is at an angle of ninety degrees with respect to the first and second directions, and opposite the third direction.

In at least one embodiment, a school bus stop sign is provided which is configured to be attached to a school bus so that the school bus stop sign is configured to be placed in a first state where the school bus stop sign projects outwards from the school bus and a second state in which the school bus stop sign does not project outward from the school bus; and wherein the wrist band device is attached to the school bus stop sign. The school bus stop sign may be an otherwise known school bus stop sign, which has been modified by having the wrist band device, or the electronic components of the wrist band device attached to the school bus stop sign.

In at least one embodiment, a method is provided which may include using a dashboard apparatus on a dashboard of a motor vehicle, to detect a wrist band device within a first range of the dashboard apparatus; selecting at least one of a plurality of audio messages stored in a computer memory of the dashboard apparatus, and playing the at least one of the plurality of audio messages stored in the computer memory of the dashboard apparatus through an audio speaker of the dashboard apparatus. The method may also include fixing the dashboard apparatus to the motor vehicle. The dashboard apparatus may be constructed and/or configured as previously described.

The method may also include using the wrist band device to detect the dashboard apparatus within the first range of the wrist band device; selecting at least one of a plurality of audio messages stored in a computer memory of the wrist band device, and playing the at least one of the plurality of audio messages stored in the computer memory of the wrist band device through an audio speaker of the wrist band device. The wrist band device may be constructed and/or configured as previously described.

In at least one embodiment, the method may include attaching the wrist band device and/or one or more components of the wrist band device to a school bus stop sign which is configured to be placed in a first state wherein the school bus stop sign protrudes out from a school bus and configured to be placed in a second state wherein the school bus stop sign does not protrude outward from a school bus.

In at least one embodiment of the present invention instead of a wrist band device, a cell phone may be used, which may not include a wrist band. However, in at least one embodiment, the cell phone is configured to implement all or nearly all of the functions that the wrist band device implements.

DETAILED DESCRIPTION OF THE DRAWINGS

Figure 1:
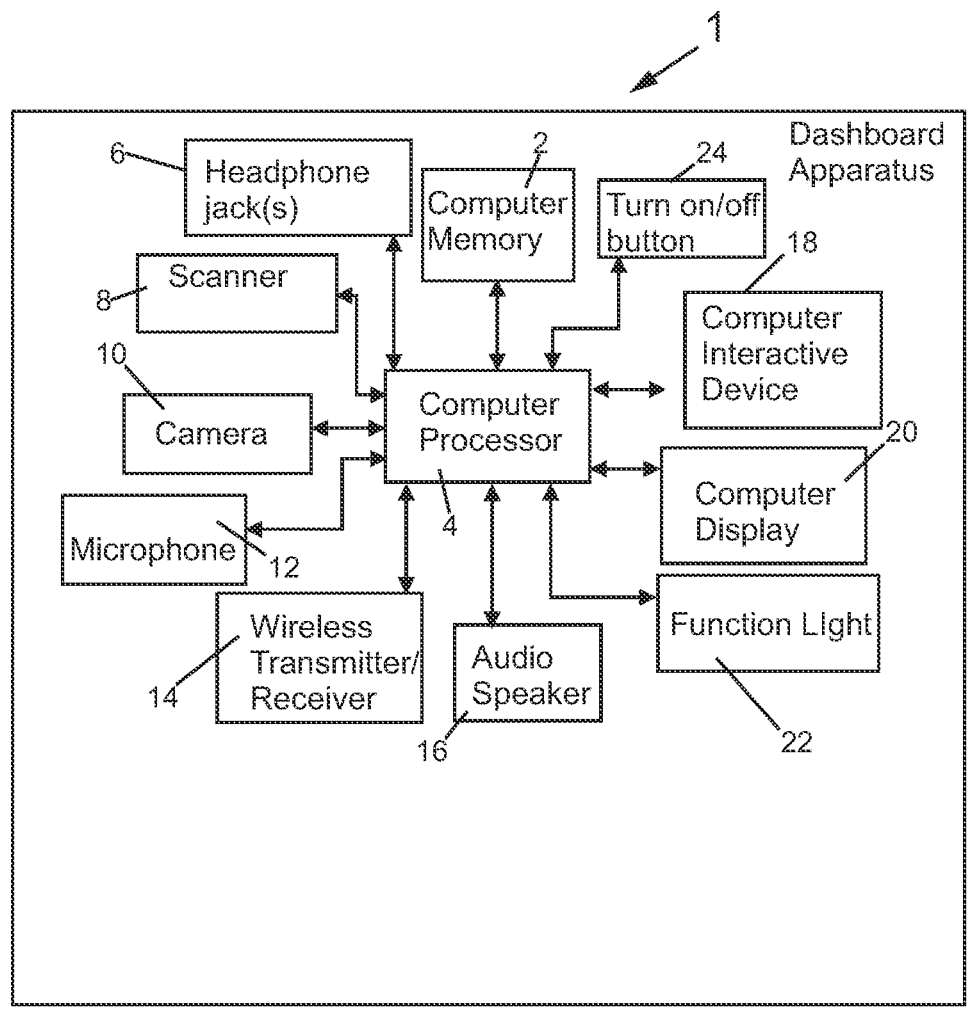
FIG. 1 shows a simplified block diagram of components for a dashboard apparatus of a vehicle, in accordance with an embodiment of the present invention.

FIG. 1 shows a simplified block diagram of components for a dashboard apparatus 1 of a vehicle, in accordance with an embodiment of the present invention.

The dashboard apparatus 1 includes a computer memory 2, a computer processor 4, one or more headphone jack(s) or port(s) 6, a scanner 8, a camera 10, a microphone 12, a wireless transmitter/receiver 13, an audio speaker 16, a computer interactive device 18, a computer display 20, and a function light 22. The components 2, 6, 8, 10, 12, 14, 16, 18, 20, and 22 communicate with the computer processor 4, such as through hardwired, optical, wireless, and/or other known, preferably bidirectional communications links.

In at least one embodiment, the function light 22 may be lit purple by the computer processor 4 as programmed by computer programming stored in the computer memory 2 to alert a vehicle operator driving a vehicle that the dashboard apparatus 1 is attached to, that an unforeseeable equipment malfunction has occurred with dashboard apparatus 1 and that the dashboard apparatus 1 needs to be replaced and is no longer road worthy. Also note that the dashboard scanner apparatus 1 is very sensitive to any of four scanners 110*a-d* attached to the electronic wrist band device 100. In at least one embodiment, the slightest detection by the dashboard scanner apparatus 1 via computer processor 4, as programmed by computer programming stored in computer memory 2, through scanner 8 or camera 10, of any of the four scanners 110a-d on the sides of the electronic wrist band 100 will automatically lead to the activation of a pre-recorded message by the computer processor 4 as programmed by computer programming in computer memory 2, to the vehicle operator to watch out for other road users on the corner of the road or crossing the street such pedestrian/s, cyclists, scooter riders, or skate board riders, and the subsequent activation of the pre-recorded audio message via speaker 114 by computer processor 104 through computer programming stored in computer memory 2, on the electronic wristband device 100 that alerts the wearer to get out the road and stay out of harm's way.

In at least one embodiment, the scanner 8 of the dashboard apparatus 1 is configured to be retractable from a dashboard housing so that the scanner 8 comes out from or projects from the dashboard housing when the vehicle, which the dashboard apparatus 1 is part of, is in motion. When the scanner 8 projects out from the dashboard housing, the scanner 8 will be in the right position to scan any electronic wrist band identical or similar to wrist band 100 of FIG. 2 and to alert/advise the vehicle operator through computer processor 4 to drive very carefully to prevent any road accidents. In at least one embodiment, the dashboard apparatus scanner 1 is only retractable in new model vehicles. In at least one embodiment, the retractable dashboard apparatus will be a part of the design of new model vehicles if it is possible to incorporate such a design into the new model vehicles.

When the vehicle is not in motion, the scanner 8 will go into the dashboard housing so that the scanner 8's location will be hidden.

Figure 2:
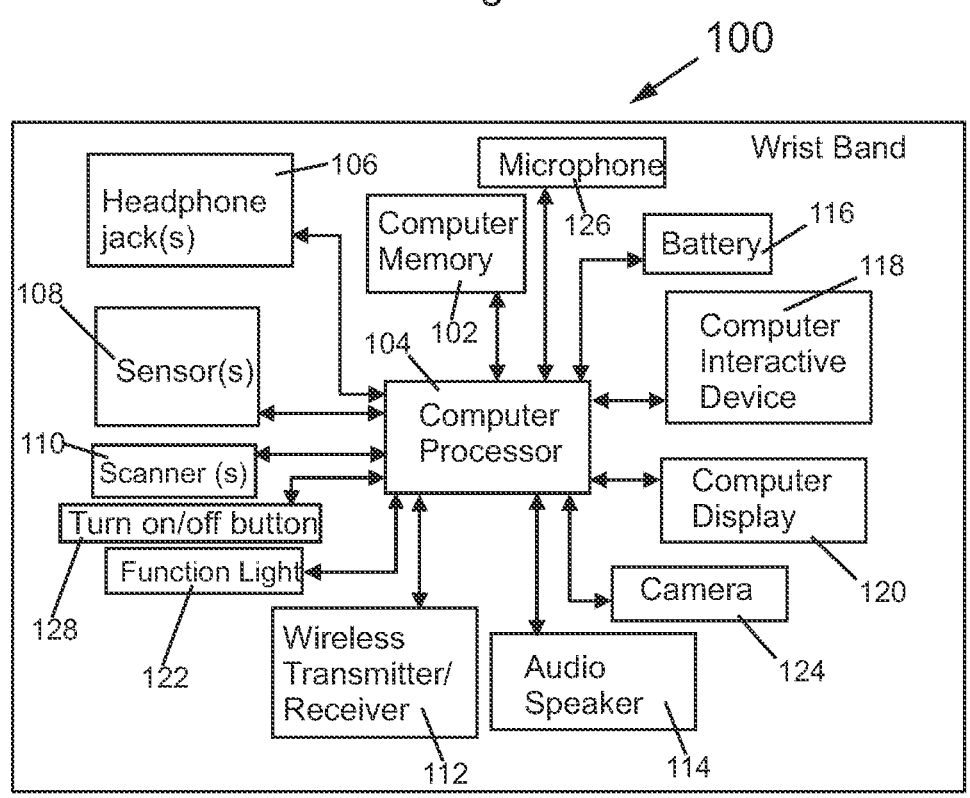
FIG. 2 shows a simplified block diagram of components for a wrist band to be worn by a person in accordance with an embodiment of the present invention.

FIG. 2 shows a simplified block diagram of components for a wrist band 100 to be worn by a person in accordance with an embodiment of the present invention.

The wrist band 100 includes a computer memory 102, a computer processor 104, headphone jack(s) 106, sensor(s) 108, scanner(s) 110, wireless transmitter/receiver 112, audio speaker 114, battery 116, computer interactive device 118, and computer display 120. The components 102, 106, 108, 110, 112, 114, 116, 118, 120, 122, 124, and 126 communicate with the computer processor 104, such as through hardwired, optical, wireless, and/or other known, preferably bidirectional communications links.

Figure 3:
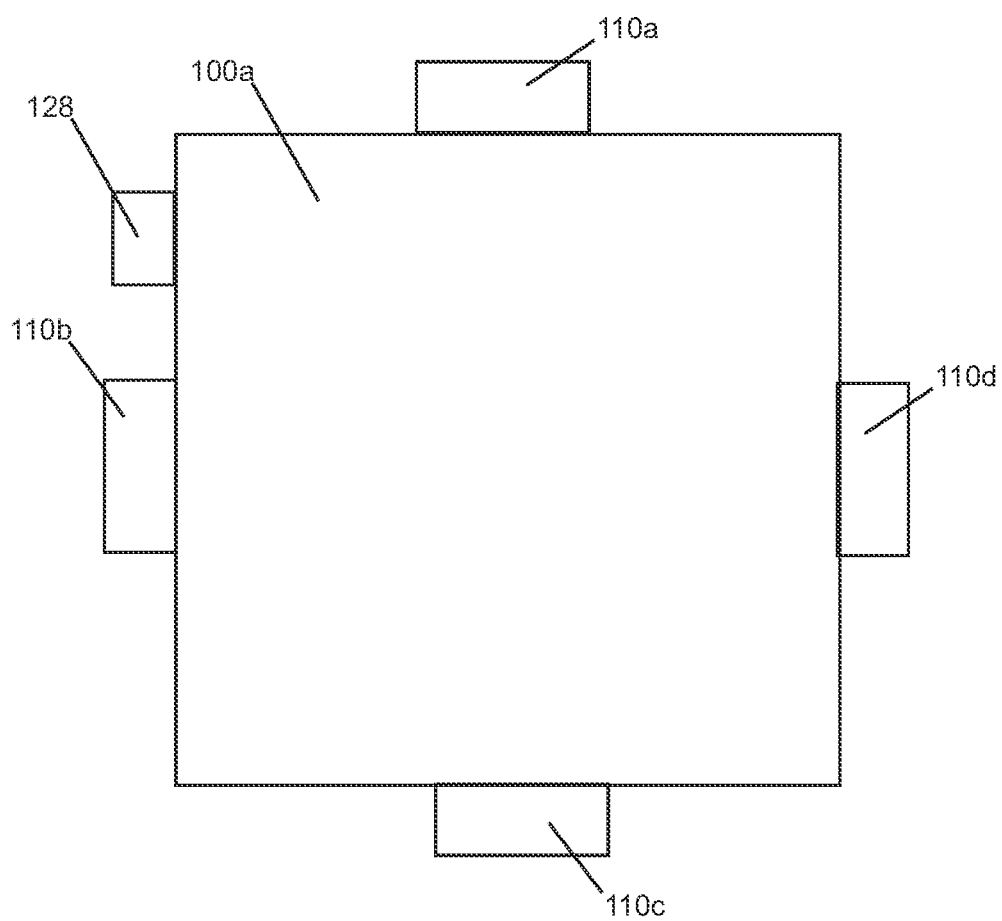
FIG. 3 shows a simplified diagram of a housing for the wrist band a some of the components attached to the housing.

The wrist band 100 may have a housing 100a, shown in simplified form in FIG. 3. The housing 100a may be similar to a time piece watch case or time piece watch housing. The housing 100a may be rectangular or square and have four sides, and on each side, preferably is located a scanner of scanner(s) 110, including scanner 110a, 110b, 110c and 110d, to scan north, west, south, and east directions.

In at least one embodiment, the scanners 110a-d may be used to alert other vehicles of the approaching vehicle which has apparatus 1 from either the westside, eastside, northside, or southside of a street. The purpose or objective of locating a sensitive scanner on all the four sides of the electronic wrist band 100 is to make it very easy for the sensitive dashboard apparatus 1 scanner to very easily reach any of the four scanners 110a-d on the four sides of the electronic wrist band 100 and simultaneously alert vehicle operators of vehicles having dashboard apparatus 1 or an apparatus similar or identical to dashboard apparatus 1.

In at least one embodiment, the function light 122 may be lit purple by the computer processor 104 as programmed by computer programming stored in the computer memory 102 to alert the electronic wristband 100 wearer that an unexpected mechanical malfunction just happened with the wristband 100 and that the wristband 100 needs to be replaced immediately because the device is no longer road worthy.

Figure 4:
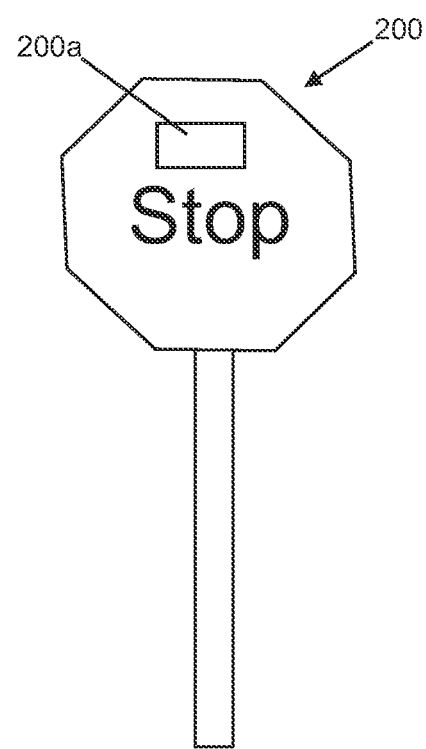
FIG. 4 is a simplified diagram of a stop sign with a scanner.

FIG. 4 is a simplified diagram of a stop sign 200 with a scanner 200a attached. The scanner 200a may be configured to scan a range of the stop sign 200 to determine if there is a pedestrian and to send a signal to the wrist band 100 and/or to the dashboard apparatus 1 to indicate that there is a pedestrian near the stop sign 200.

The headphone jack(s) 6 of the dashboard apparatus 1 may include one or two headphone jacks which are fixed to and/or integrated with the dashboard apparatus 1 and which are configured to be used by the vehicle operator whenever the vehicle is on the road.

The headphone jack(s) 6 for the vehicle operator allows the operator to concentrate on the road while operating a vehicle and to watch for other road users such as pedestrians, cyclists, motorcyclist, scooters or skateboard ridders and whenever the dash board scanning apparatus 1 scans by use of scanner 8 the electronic wrist band, such as wrist band 100 of any of the above other road users a pre-recorded message will instantly be played to the vehicle operator, through audio speaker 16 by computer processor 4 as programmed by computer program in computer memory 2, to provide an audio warning such as: "please watch out for the pedestrians on the street corner or crossing the street" that is if the dashboard scanning apparatus 1 scanned via use of scanner 8 a pedestrian's electronic wrist band 100.

However, if the dashboard scanning apparatus 1 scanned through scanner 8 a cyclist then a pre-recorded voice in the computer memory 2 of the dashboard apparatus 1 will be activated by the computer processor 4 to instantly alert the vehicle operator by providing an audio warning through audio speaker 16, such as: "please watch out for the cyclist on the street corner or crossing the street".

On the other hand, if the dashboard apparatus 1 scans the electronic wrist band 100 of a scooter rider, a prerecorded message will be activated by the computer processor 4 as programmed by a computer program in computer memory 2, to play through the audio speaker 16 to state for example: "please watch out for the scooter rider".

The scanner 8 of the dashboard apparatus 1 is configured to not operate if an engine of the vehicle in which the dashboard apparatus 1 is located is idle or the vehicle is parked. In at least one embodiment, the scanner 8 of the dashboard apparatus 1 is configure to only function when the vehicle is in motion. The scanner 8 and/or the computer processor 4 may be connected to the speedometer to determine of if the vehicle is in motion and then may act accordingly.

The camera 10 of the dashboard apparatus 1 is configured to penetrate or pierce through slow clouds, fog, or dust clouds, and advise the vehicle operator about the road condition ahead, through the computer processor 4 and the audio speaker 16 and/or the computer display 20, in accordance with computer programming stored in the computer memory 2.

Referring again to FIG. 1, in at least one embodiment, the scanner 8 of the dashboard apparatus 1 is configured to scan and/or detect any of the scanners 110a-110d (which are part of scanner(s) 110) of the wrist band 100. A signal or signals from the scanner 8 of the dashboard apparatus 1 is configured to be able to penetrate or pierce through preferably any or virtually any article of clothing that may cover the electronic wrist band 100, such as a long sleeve shirt, jacket, or suite sleeve.

In at least one embodiment, as soon as the vehicle operator drives his or her vehicle into the roadway and the dashboard apparatus 1 scanner 8 is configured to be able to scan the electronic wrist band 100 or any of the scanner(s) 110 (such as scanners 110*a-d*) from typically a distance of about one hundred feet away.

The scanner 8 of the dashboard apparatus 1 can scan or detect any of the four scanners 110*a-d* attached to the sides of the electronic wrist band housing 100*a*, shown in FIG. 3. The computer processor 4 is programmed by a computer program stored in computer memory 2 to cause an audio pre-recorded message, stored in computer memory 2 to play through audio speaker 16 to state, for example: "please watch out for the pedestrian on the street corner or crossing the street."

However, if it happens to be a motorcyclist that is on the street corner or crossing the street a pre-recorded message stored in computer memory 2 will be activated to play through the speaker 16, such as for example: "please watch out for the motorcyclist on the street corner or crossing the street." Similarly, if it is a scooter rider on the street corner or crossing the street a pre-recorded message will be activated to play an audio message through speaker 16, such as "please watch out for the scooter rider on the street corner or crossing the street and be patient. remember it is better to be safe than sorry". If a skate board rider is at the street corner or is crossing the street and as soon as the dashboard apparatus scanner 8 detects the electronic wrist band 100 or scanners 110*a-d* of the skate board rider, a prerecorded message stored in computer memory 2 may be activated and played through audio speaker 16 by computer processor 4 to state: "please watch out for the skateboard rider on the corner of the street or crossing the street, and be patient, it is better to be safe than sorry."

In at least one embodiment, simultaneously or nearly simultaneously with the audio message played on the speaker 16 of the dashboard apparatus 1, an audio message, pre-recorded and stored in the computer memory 102, may be played through the audio speaker 114 of the wrist band 100 by the computer processor 104 as programmed by the computer memory 102, such as for example: "please watch out for the oncoming vehicle and please stay out of harm's way."

The wrist band 100 includes a function light 122 which is activated to be lit green the computer processor 104 when the electronic wrist band 100 is functioning properly. The function light 122 may be lit yellow whenever if the electronic wrist band 100 is not functioning properly and/or is not fully charged. When the function light is lit yellow the charging capacity may still very high and the wrist band 100 may still be capable of receiving signal from the dashboard apparatus 1, such as through wireless transmitter/receiver 112 and may continue to receive signals at a very high level until the charging level steps down to the next level which may light the function light 122 the color red. Whenever the function light 122 steps down to the red color stage that alerts the electronic wrist band 100 wearer that there is insufficient power, such as battery power left and the wrist band 100 may not be capable of receiving signals from and/or communicating generally with the dashboard apparatus 1, such as through wireless transmitter/receiver 112 and wireless transmitter/receiver 14.

With the function light 122 lit red, the wrist band 100 may need to be replaced or recharged, however, it is preferred that there be sufficient power when the function light 122 initially turns red for the wrist band 100 to play an audio message to the user of the wrist band 100 through audio speaker 114 as implemented by the computer processor 104 in accordance with a computer program and a pre-recorded message stored in the computer memory 102, to the effect that the wrist band 100 should be replaced or recharged.

In at least one embodiment, it is preferred that the dashboard apparatus 1 and the wrist band 100 be waterproof or water resistant and both the dashboard apparatus 1 and the wrist band 100 should employ blue tooth technology.

In at least one embodiment, the wrist band 100 may be connected or attached next to a school bus stop sign, which is made to protrude out from a school bus when the school bus stops.

The wrist band 100 is modified to be two sided and attached to the stop sign on the side of the school bus. As the school bus stops in any bus stop to either pick up or drop students and the school bus driver activates or displays the stop sign on the side of the school bus that is attached, the dashboard apparatus 1 scanner 8 on the civilian vehicle is able to scan the digital stop sign device or wrist band 100 attached to the school bus stop sign and a prerecorded audio message will be activated through audio speaker 16 by the computer processor 4 as stored in compute memory 2 and in accordance with a computer program stored in computer memory 2, to state something such as: "it is the state law that no vehicle operator should drive pass the school bus while picking or dropping school children at a school bus stop. It is a violation, and you can be ticketed by the police."

In at least one embodiment, the digital stop signs (which may include the electronic wrist band 100 or in a modified form), the electronic wrist band 100, the school bus digital stop sign (which may include the electronic wrist band 100 or in a modified form) and the dashboard apparatus 1 are all waterproof or water resistant. The dashboard apparatus 1 and the electronic wrist band 100, in at least one embodiment, have a "turn on and a turn off buttons" 24 and 128 respectively, which may be attached to the sides of the dashboard apparatus 1 and the wrist band 100 and which can be pushed or toggled to an "off" position or state to conserve energy or power. In at least one embodiment, before the vehicle operator gets onto the highway/road he/she must turn on the dashboard apparatus 1 on/off button 24 and a blue light may be configured to be shown by the computer processor 4 as programmed by computer software in the computer memory 2 to light the function light 22 blue to show that the dashboard apparatus 1 has been turned on and is ready for proper operation. Similarly, the electronic wrist band device 100 has a turn on and turn off button 128, which may be on a side of the wrist band housing 100*a* shown in FIG. 3. Before a user of a wrist band 100 gets on the road, (such as on a scooter, bicycle, skateboard, or as a pedestrian), in at least one embodiment, he/she must turn the wrist band 100 on using button 128 for the wrist band 100 to be operational.

This digital school bus stop sign embodiment re-emphasizes the importance of civilian vehicle operators to obey the school bus stop sign. The digital school bus stop sign is configured to be in electronic communication with nearby police station monitoring center via remote control.

In at least one embodiment, the new digital school stop sign model (which may include wrist band 100 or a modified form of wrist band 100) may include a physical school stop sign which is identical or similar to the current physical school stop sign, which, as known can be put into an extended state where it extends out from a school bus, for example, so the physical stop sign can be seen by motorists behind the school bus and in front of the school bus, along a street that the school bus is travelling on. The physical school bus stop sign, extending from the school bus, may be configured to be at about a fifty degree angle with respect to the side of the school bus. The physical school bus stop sign, typically faces both sides of the street. A wrist band 100 or a device similar to the wrist band 100 may be attached to both sides of the physical school bus sign, so that for example the sensor 108, scanner 110, camera 124 and other components can detect and/or process images or data from vehicles, bikes, scooters, skateboards, and/or pedestrians both behind and in front of the school bus. If two such wristbands 100 are used on two sides of the physical school bus sign, the computer processor 104 of each wristband 100 may be programmed to communicate with each other by computer software stored on each computer memory 102 through wireless transmitter/receivers 112.

In at least one embodiment the a vehicle having the dashboard apparatus 1 or similar or identical to dashboard apparatus 1, will be able scan, such as through scanner 8, the displayed or activated digital school bus stop device (or wrist bands 100 attached to the two sides of the physical school bus stop sign) and prerecorded messages may be stored in computer memory 2 and played through audio speaker 16 to the motorist driving a vehicle with dashboard apparatus 1 or identical or similar to apparatus 1.

In at least one embodiment, there is a protective layer or cover protecting the outer digital bus stop device, i.e. protecting the two wrist bands 100 or modified versions of wrist band 100, whenever the digital bus stop device is not in an extended position, but rather in a retracted position, to prevent tampering or vandalism of the wrist bands 100 on the physical school bus stop sign.

In at least one embodiment, the wrist band 100 may be attached to any signpost warning which advises motorists to slow down in a particular neighborhood. As a vehicle, with a dashboard apparatus 1 approaches and/or drives in these neighborhoods the dashboard apparatus 1 scanner 8 is able to scan the wrist band 100 or digital slow device, and a prerecorded message will be played through speaker 16 as stored in computer memory 2 and implemented by computer processor 4 in accordance with computer programming in computer memory 2, to the effect of: "please slow down and drive very carefully as you drive in this neighborhood and remember it is better to be safe than sorry".

In at least one other embodiment, the wrist band 100 may be attached to any temporary stop sign, which may be located at pedestrian crossings, which overcomes the problem that traffic street lights are too expensive to put at every block. In at least one embodiment, the computer processor 104 may implement a computer program stored in the computer memory 102 so that as a civilian vehicle approaches within a distance of about ten feet from the from a distance of about 10 feet to the wrist band 100 located at the temporary stop sign, the dashboard apparatus 1 scanner 8 will scan and/or detect the wrist band 100 and a prerecorded message will be played through speaker 16 by the computer processor 4 in accordance with a computer program stored in the computer memory 2 such as "it is the law of the state for every vehicle operator to stop for pedestrians at crosswalks or the operator will be ticketed." In at least one embodiment, the wrist band 100 located at the temporary stop sign area, may be electronically connected to and/or in communications with a nearby police monitoring center. The wrist band 100 may also include a camera 124 for remote monitoring which communicates with the computer processor 104. Camera 124 may be a micro camera, may also have a micro camera. The remote monitoring through the camera 124 may be similar or identical to the remote monitoring by one or more of cameras 110, 112, 114, and 116 discussed in paragraphs 34 and 35 and shown in FIG. 4 of U.S. Pat. No. 10,347,107 to Okezie, which is incorporated herein by reference.

Using the wrist band 100 for a digital stop for pedestrians encourages motorists to stop for pedestrians at all crosswalks. Generally, all motorists are also pedestrians at some point. The wrist band 100 may be voice activated such as through microphone 126, which communicates with computer processor 104. The dashboard apparatus 1 may be voice activated through microphone 12 which communicates with computer processor 4. In at least one embodiment, both wrist band 100 and dashboard apparatus 1 are equipped with blue tooth technologies.

In at least one embodiment of the present application, the wrist band 100 is used as a slow down alert device to both electronic bicycle and non-electronic bicycle riders, electronic scooters and non-electronic scooter riders, an electronic skateboard and non-electronic skateboard riders.

In at least one embodiment, the scanner 110 of the wrist band 100 has a great range and is very sensitive. The scanner 110 is configured to be able to scan or detect a scanner that is attached to a temporary stop sign at the middle of every crosswalk. As a bicycle, scooter, or skateboard rider approaches the temporary stop sign with also has the wrist band 100 or a modified version of the wrist band 100, scanner 110 for the bicycle, scooter, or skateboard rider will scan or detect the scanner 110 attached to a similar wrist band 100 for the temporary stop sign and a pre-recorded message will be activated on the wrist band 100 of the bicycle, scooter, or skateboard rider, such as "Please be prepared for pedestrians crossing crosswalk; you are responsible for not stopping or yielding to pedestrian on the crosswalk." In at least one embodiment, the electronic wrist band scanner 110 for a pedestrian, bicyclist, scooter, or skateboard rider is configured to scan or detect a similar scanner 110 attached to a temporary stop sign on the crosswalks, at about a ten or fifteen foot distance.

In at least one embodiment, the wrist band 100 is configured to remind bike, scooter, and skateboard riders, electronic or non-electronic, who are wearing the wrist band 100 on their wrists to either yield to stop for pedestrians in crosswalks.

In at least one embodiment, every crosswalk is equipped with a temporary stop sign which includes a wrist band 100 attached to the temporary stop sign. In addition, a similar or identical electronic wristband 100 worn by each pedestrian, bike, scooter, and skateboard rider is equipped with scanner(s) 110 that is able to scan the digital stop wrist band 100 for attached to the temporary stop signs in the crosswalks from a distance of about fifteen feet.

Once the scanner(s) 110 on the electronic wrist band 100 scans the attached digital stop sign wrist band 100 a prerecorded message will be played on the audio speaker 114 of the wrist band 100 of the bike, scooter, or skateboard rider, by the computer processor 104 as directed by computer software stored in the computer memory 102, to the effect that: "it is the law of the state that every bike, scooter, and skateboard rider must yield or stop for pedestrians on crosswalks, always ride your scooter slowly and all times to prevent collisions with pedestrians. Remember "it is better to be safe than sorry".

In at least one embodiment, both the dashboard apparatus 1 and the electronic wrist band 100 have separate turn on and turn off buttons 24 and 128 which must be turned on in order for the respective devices to function. Similarly, in at least one embodiment, the headphone jack(s) 6 and 106, of the dashboard apparatus 1 and the wrist band 100, respectively, are independent of each other and are mutually exclusive. This means that in one embodiment, a headphone wire will not fit both the headphone jack(s) 6 and the headphone jack(s) 106.

In at least one embodiment, an "individual vehicle identification" technology is provided. The "individual vehicle identification" technology preferably uses all of the following information: a vehicle license plate, a vehicle identification number ("VIN"), an auto insurance policy number, year, model or make of the vehicle, and color of the vehicle. All of the previous information must be provided by a vehicle operator, such as through dashboard apparatus 1, and stored in computer memory 2, for any vehicle operator to safely operate his/her vehicle and all the information must be consistent. If any vehicle operator tampers or switches the original vehicle license plate or any other information, the dashboard apparatus 1 will not start allow the vehicle to start and a prerecorded message will be played via audio speaker 16, as implemented by the computer processor 4 and programmed and stored in computer memory 2, such as: "the vehicle license plate has been tampered with and please make sure the vehicle license plate is correct". The camera 10 may include more than one camera, and one of these cameras 10 may be focused on the physical vehicle license plates to determine what those physical license plates state. This information may be provided to the computer processor 4, in order to determine if an appropriate audio message should be sent out audio speaker 16.

In at least one embodiment, the dashboard apparatus 1 may give motorists an advance audio warning to be prepared to stop because they are currently travelling on a road on which an encounter with deer is likely.

The wrist band 100 may be attached to a deer crossing sign at a location. As the dashboard apparatus 1 approaches the deer crossing sign, the dashboard apparatus 1 will detect or scan the wrist band 100 at the deer crossing sign, and a pre-recorded message will be played via the speaker 114 as implemented by the computer processor 104 in response to a computer program stored in the computer memory 102 and as stored in the computer memory 102, to the effect of: "you are approaching deer ally, please watch out for deer/s crossing the street, drive slowly and be prepared to stop for the street crossing deer. You do not want to attempt to run over any deer with your vehicle because the damages to your vehicle can be very expensive to repair. Try to avoid any contact with your vehicle and a deer. It is not worth it."

In at least one embodiment, the wrist band 100 may be charged and the function light 122 may have a green lit color when fully charged, a yellow lit color when partially charged, and a red color that alerts the user that it is time to replace or recharge the battery 116 of the wrist band 100.

In another embodiment, a wrist band 100 may be attached to a food truck service physical stop sign or attached to the food truck itself, such as attached to an ice cream truck. In at least one embodiment, the computer processor 4 of the dashboard apparatus 1 of the motor vehicle may be programmed by a computer program in computer memory 2 to scan via scanner 8 or determine via camera 10 that a food truck service physical stop sign (such as an ice truck stop physical top sign) has been deployed, when the vehicle gets with a range of the physical sign, such as within fifty feet of the physical sign. When the vehicle gets within the range of the wrist band 100 attached to the food truck service physical sign, the computer processor 4 may play an audio message on the speaker 16, as a result of programming in computer memory 2 and as stored in computer memory 2 to the effect of: "It is state law for every vehicle operator approaching any food service truck to come to a full stop and to make certain that there is no person or persons trying to cross the street to buy something from the food service truck and to proceed with utmost caution to prevent any vehicular accident and fatality." Using the wrist band 100 on a physical sign for a food service truck will save lives. The camera 124 of the wrist band 100 may interact with a monitoring center in a police department.

Figure 5:
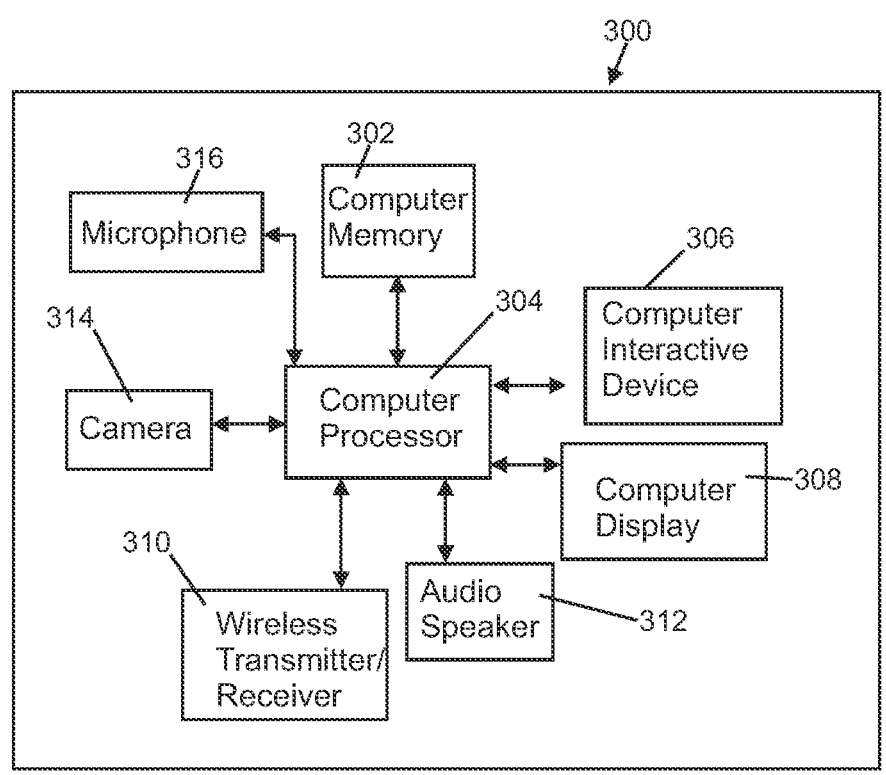
FIG. 5 shows a simplified diagram of a cell phone or smart phone.

In at least one embodiment of the present invention, a cell phone location finder is provided. FIG. 5 shows a simplified diagram of a cell phone or smart phone 300. The cell phone or smart phone 300 includes computer memory 302, a computer processor 304, a computer interactive device 306, a computer display 308, a wireless transmitter/receiver 310, an audio speaker 312, a camera 314, and a microphone 316. The components 302, 306, 308, 310, 312, 314, and 316 communicate with the computer processor 304 over typically bidirectional communications links such as hardwired, optical, or wireless communications links.

In at least one embodiment of the present invention, the cell phone location monitoring of U.S. Pat. No. 10,347,107, incorporated by reference herein, is modified, and thereby uses a cell phone for location finding and effectively as a "guardian angel".

In at least one embodiment of the present invention, the camera 314 may be connected and/or provide images and video to a remote home monitoring system, in accordance with computer programming stored in the computer memory 302 and as implemented by computer processor 304. In at least one embodiment, the camera 314 may be activated or turned on to provide images or video to the remote home monitoring center via wireless transmitter/receiver 310, in an emergency, such as when activated by a user of the cell phone 300, such as by a user stating orally "I need help". The user may, for example, be threatened by a robber, or may have fallen in their house. The oral statement of the user for "help", received through the microphone 316, may be recognized through voice recognition software stored in the computer memory 302, as being the owner of the cell phone, by for example comparison with voice recognition data stored in the computer memory 302.

With the cell phone camera 314 activated by the "help" message, the remote monitoring station can record any actions by a robber, or the status of the user, for example if the user has fallen down. The user of cell phone 300 may stop the camera 314 from recording and/or transmitting images or video through the wireless transmitter/receiver 310 to the remote station by stating orally "I am good now" or all is well now" or something to that effect.

In addition, if the owner or user of the cell phone 300 is an autism patient or alzheimer's patient or generally is compromised mentally, the monitoring station may display the patient's mental capacity status with for example an autism spectrum image or some other displayed image along with the images provided by camera 314. In at least one embodiment, where there is a mentally compromised patient, the images may be provided by camera 314 to a monitoring station, as programmed by computer software in computer memory 302, at regular intervals, such as every fifteen minutes to monitor the status of a patient.

With the technology of one or more embodiments of the present invention no one will lose their cell phone to left because the cell phone with the camera on some of the time will be able to capture the facial appearance of a cell phone thief. Moreover, if any cell phone or smart phone is stolen, the cell phone GPS (global positioning satellite) is configured to provide the monitoring station the exact address and location of the cell phone thief.

Figure 6:
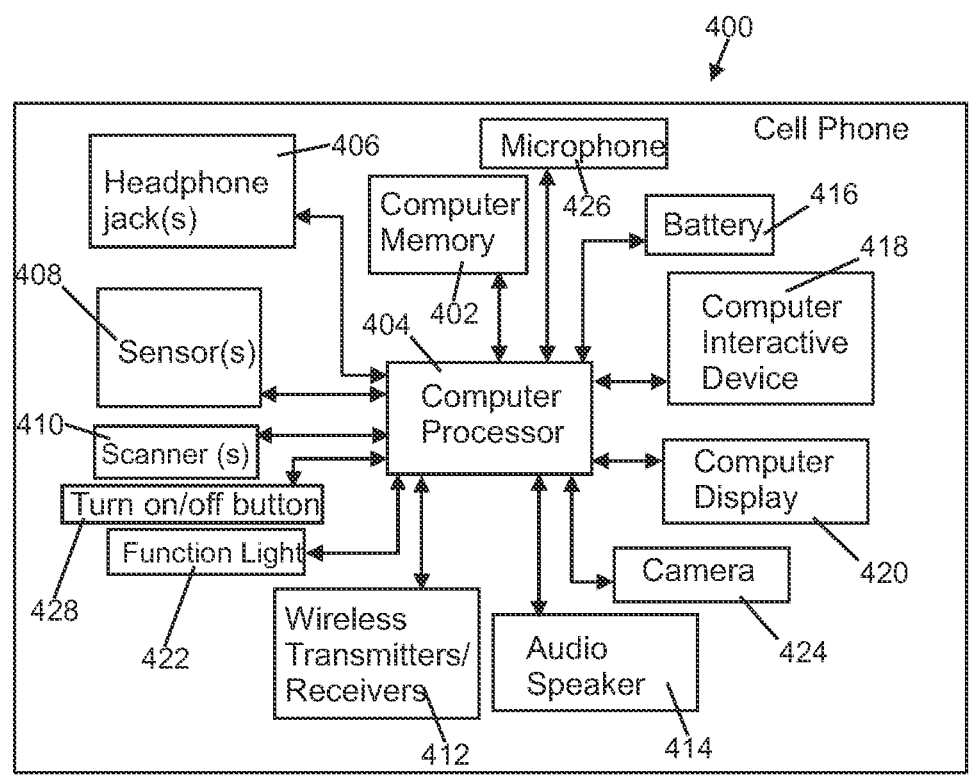
FIG. 6 shows a simplified diagram of another cell phone or smart phone.

In at least one embodiment, the computer programming provided in computer memory 102 of wrist band 100 is provided in a computer memory of a cell phone, such as in computer memory 402 in cell phone 400 in FIG. 6. Any and all of the functions of computer processor 104 of wrist band 100, in at least one embodiment, are implemented by the computer processor 404 of cell phone 400.

The cell phone 400 in FIG. 6 may include a computer memory 402, a computer processor 404, headphone jack(s) 406, sensor(s) 408, scanner(s) 410, wireless transmitter/receiver 412, audio speaker 414, battery 416, computer interactive device 418, and computer display 420, function light 422, camera 424, microphone 426, and turn on/off button 428. The components 402, 406, 408, 410, 412, 414, 416, 418, 420, 422, 424, 426, and 428 communicate with the computer processor 404, such as through hardwired, optical, wireless, and/or other known, preferably bidirectional communications links.

The cell phone 400 in FIG. 6, may be any known smart phone, such, for example, as an Apple (trademarked) I Phone (trademarked).

Almost everybody has his or her own cell phone and everybody carries his or her cell just about anytime they leave their various homes. The functions of wrist band 100, may be implemented alternatively in a cell phone, such as in cell phone 400 in FIG. 6, without use of a wrist band.

The cell phone 400 is configured to prevent any future recurrences of collisions of motor vehicles with pedestrians, cyclists, motorcyclists, scooter riders, and skate board ridders in the USA and globally.

In at least one embodiment, similar to the wrist band 100, the cell phone 400 may be used to alert or warn the owner or the holder of each particular cell phone 400 at any given time on the road or highways, of an approaching vehicle and to watch out for the approaching vehicle and to stay out of harm's way. For example, the camera 424, sensor 408, or scanner 410 on the cell phone 400 may be programmed by computer software stored in the computer memory 402 to detect an automobile which is coming towards a pedestrian who is holding the cell phone 400. The computer processor 404 in response to detecting the oncoming automobile, may be programmed by computer software in computer memory 402 to cause an audio warning to be played through audio speaker 414. Also, optional headphones connected through headphone jack 406 may be used to warn a person who is in possession of the cell phone 400.

In at least one embodiment, the dashboard apparatus 1, shown in FIG. 1, may be programmed to simultaneously, or nearly simultaneously warn the vehicle operator of the vehicle that is approaching the pedestrian with the cell phone 400. The cell phone 400 may emit a signal which is detected by the dashboard apparatus 1, via wireless transmitter/receiver 14. The dashboard apparatus 1 may detect the pedestrian through the scanner 8 and/or camera 10, and the computer processor 4 may be programmed to emit an audio warning to the driver through audio speaker 16. The audio warning may be a message, such as an audible message to watch out for either pedestrians, cyclists, motorcyclists, and/or scooters or skateboard riders. The message may identify the side of the automobile that the driver should watch out for, i.e. "watch out for pedestrians on the left side".

The audio message emitted by audio speaker 16, may be derived from message data stored in computer memory 2. The audio message emitted by speaker 16 may include an exact or approximate location of the particular pedestrian to watch out for, such as a street crossing, such as "Third Avenue and Main Street". The audio message emitted by speaker 16 may specify the distance of the driver of automobile with dashboard apparatus 1, from or to a particular pedestrian, cyclist, motorcyclist, or scooter or skateboard driver. For example the audio message may indicate that the driver of a vehicle with apparatus 1, is fifteen feet away from a pedestrian.

One of the major goals and objectives of the combination of technology of the dashboard apparatus 1 FIG. 1 and the cell phone 400 of FIG. 6 is to prevent all unwanted collisions between any vehicle/s on our roads and highways and any other road users such as pedestrians, cyclist/s, motorcyclists, scooter riders, or skateboard riders.

With this technology the safety of individuals who share the road with automobiles or trucks, such as pedestrians, cyclists, motorcyclists, scooter and skateboard riders is greatly aided due to the warnings implemented by the dashboard apparatus 1 of FIG. 1 and the cell phone 400 of FIG. 6.

The computer processor 4 may be programmed by computer software in computer memory 2 to provide audio messages through audio speaker 16 and/or video messages or data through computer display 20 which detail the approximate location of all non automobile and non truck presences on the road at a given time.

In addition, in accordance with at least one embodiment, every cell phone user, of a cell phone 400, of an individual using the road, within a certain distance of the vehicle with apparatus 1, is warned to get out of the way of an approaching vehicle with apparatus 1.

In at least one embodiment, the scanner 8, camera 10, and/or wireless transmitter/receiver 14 is very sensitive to the presence of a cell phone 400 and/or signals from a cell phone 400 of a user of the road, other than an automobile or truck.

In at least one embodiment, the vehicle dashboard apparatus 1 may not be fixed to a dashboard of a motor vehicle. The dashboard apparatus 1 may also be located or attached or affix to either to the left or right side of or parallel to the vehicle inside a rear view mirror for stability facing the roadway so that the dashboard apparatus 1 would be able to scan any of the various road safety digital devices with audio and advise the cell phone owners/users, such as cell phones similar or identical to cell phone 400 in FIG. 6.

Figure 7:
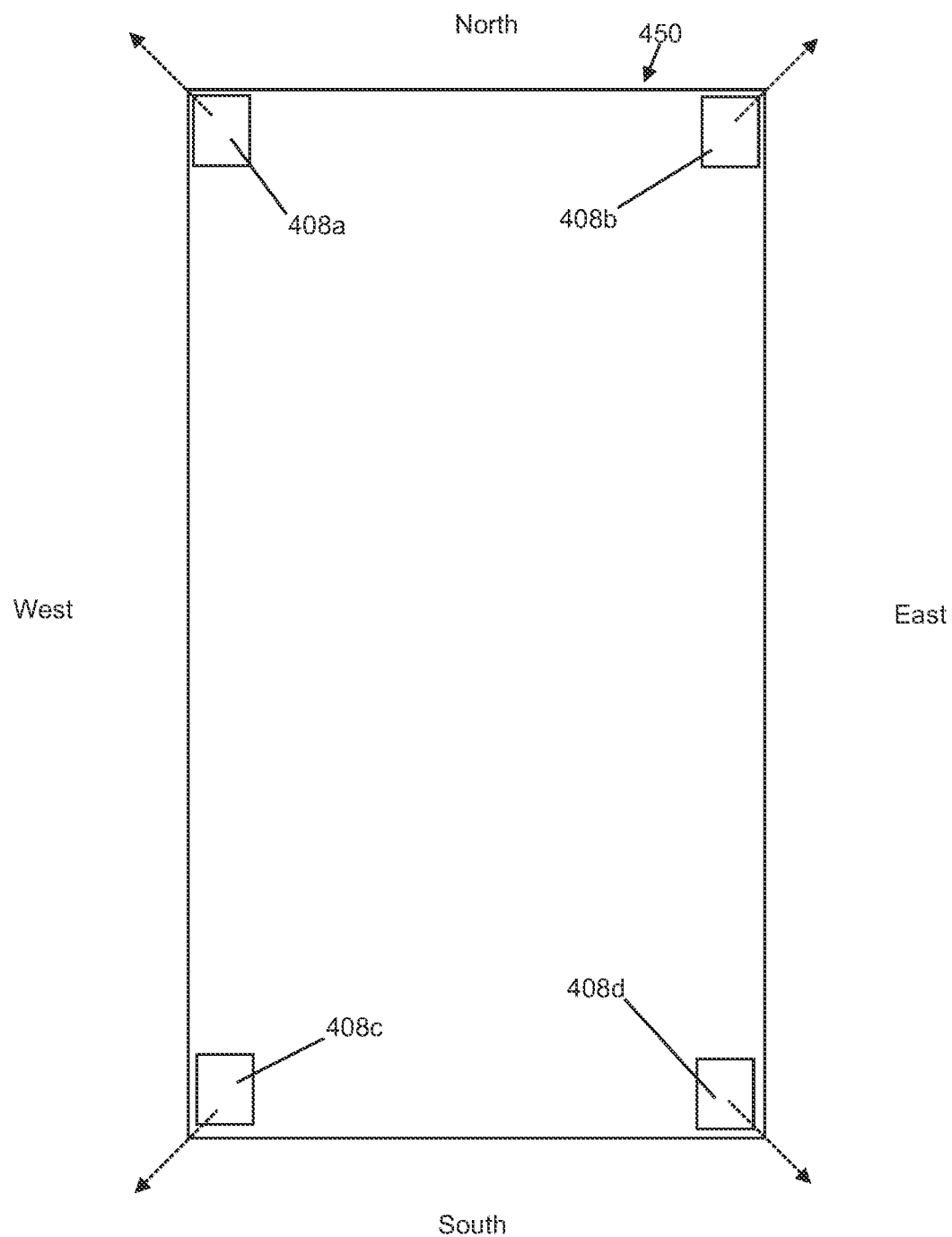
FIG. 7 shows a simplified diagram of a housing of a cell phone and location of four sensors, scanners, and/or transmitter/receivers located at the corners of the housing.

In at least one embodiment, the dashboard apparatus 1 scanner or scanners 8 are configured to be very sensitive to any one of four traffic watch sensors or scanners 408a, 408b, 408c, or 408d. In at least one embodiment, The scanner or sensor 408a is attached, to the upper left hand corner, inside of a housing 450 in which the components of the cell phone 400 are located. The scanners or sensors 408b, 408c, and 408d are attached to the upper right hand corner, lower left hand corner, and lower right hand corner, respectively, inside of the housing 450. The scanners or sensors 408a, 408b, 408c, and 408d, may be focused outwards, detect more strongly, or have a field of vision concentrated in the northwest, northeast, southwest, and southeast directions, respectively, as shown by the arrows in FIG. 7, if the phone housing 450 is oriented as shown in FIG. 7. This allows the phone to more readily detect an approaching vehicle, such as a vehicle with dashboard apparatus 1. The scanners/sensors 408a-d may be part of sensors 408, scanners 410, and/or wireless transmitters/receivers 412, and are typically connected by communications links to computer processor 404 of cell phone 400.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
    a dashboard apparatus configured to be fixed to a motor vehicle comprising:
        a computer processor;
        a computer memory in communication with the computer processor of the dashboard apparatus through a communications link;
        a device for detecting a cell phone within a first range of the dashboard apparatus, wherein the device for detecting the cell phone is in communication with the computer processor of the dashboard apparatus through a communications link;
        and an audio speaker in communication with the computer processor of the dashboard apparatus through a communications link; and
        wherein the computer memory of the dashboard apparatus includes computer software implemented by the computer processor of the dashboard apparatus to receive one or more signals from the device for detecting the cell phone, and to select based on the one or more signals from the device for detecting the cell phone at least one of a plurality of audio messages stored in the computer memory of the dashboard apparatus, and to play the at least one of the plurality of audio messages through the audio speaker of the dashboard apparatus;
    wherein the dashboard apparatus includes a camera which is focused on a license plate of the motor vehicle and which provides information to the computer processor of the dashboard apparatus to indicate what the license plate of the motor vehicle states;
    wherein the computer processor of the dashboard apparatus is configured to cause a first prerecorded message to be played through the audio speaker of the dashboard apparatus in accordance with programming in the computer memory of the dashboard apparatus; and
    wherein the first prerecorded message indicates that the license plate of the motor vehicle has been tampered with; and
    wherein the dashboard apparatus is configured to not allow the vehicle to start if the license plate has been tampered with.

2. The apparatus of claim 1 further comprising:
    the cell phone comprising
        a computer processor;
        a computer memory in communication with the computer processor of the cell phone through a communications link;
        a device for detecting the dashboard apparatus within a range of the cell phone, wherein the device for detecting the dashboard apparatus is in communication with the computer processor of the cell phone through a communications link;
        and an audio speaker in communication with the computer processor of the cell phone through a communications link; and
        wherein the computer memory of the cell phone includes computer software implemented by the computer processor of the cell phone to receive one or more signals from the device for detecting the dashboard apparatus, and to select based on the one or more signals from the device for detecting the dashboard apparatus at least one of a plurality of audio messages stored in the computer memory of the cell phone, and to play the at least one of the plurality of audio messages stored in computer memory of the cell phone through the audio speaker of the cell phone.

3. The apparatus of claim 1 wherein the device for detecting the cell phone includes a camera.

4. The apparatus of claim 2 wherein the device for detecting the dashboard apparatus includes a camera.

5. The apparatus of claim 1 wherein the device for detecting the cell phone includes a scanner.

6. The apparatus of claim 2 wherein the device for detecting the dashboard apparatus includes a scanner.

7. A method comprising
    using a dashboard apparatus on a dashboard of a motor vehicle, to detect a cell phone within a first range of the dashboard apparatus;
    selecting at least one of a plurality of audio messages stored in a computer memory of the dashboard apparatus, and
    playing the at least one of the plurality of audio messages stored in the computer memory of the dashboard apparatus through an audio speaker of the dashboard apparatus;
    wherein the dashboard apparatus includes a camera which is focused on a license plate of the vehicle and which provides information to the computer processor of the dashboard apparatus to indicate what the license plate of the vehicle states; and the method further comprising:
    causing a first prerecorded message to be played through the audio speaker of the dashboard apparatus in accordance with programming in the computer memory of the dashboard apparatus; and
    wherein the first prerecorded message indicates that the license plate of the vehicle has been tampered with; and
    further comprising attaching the cell phone to a school bus stop sign which is configured to be placed in a first state wherein the school bus stop sign protrudes out from a school bus and configured to be placed in a second state wherein the school bus stop sign does not protrude outward from a school bus.

8. The method of claim 7 further comprising
    fixing the dashboard apparatus to the motor vehicle; and
    wherein the dashboard apparatus comprises:
        a computer processor;
        a computer memory in communication with the computer processor of the dashboard apparatus through a communications link;
        a device for detecting a cell phone within the first range of the dashboard apparatus, wherein the device for detecting the cell phone is in communication with the computer processor of the dashboard apparatus through a communications link; and
        the audio speaker in communication with the computer processor of the dashboard apparatus through a communications links; and wherein the computer memory of the dashboard apparatus includes computer software implemented by the computer processor of the dashboard apparatus to receive one or more signals from the device for detecting the cell phone, and to select based on the one or more signals from the device for detecting the cell phone the at least one of a plurality of audio messages stored in the computer memory of the dashboard apparatus, and to play the at least one of the plurality of audio messages stored in the computer memory of the dashboard apparatus through the audio speaker of the dashboard apparatus.

9. The method of claim 7 further comprising
using the cell phone to detect the dashboard apparatus within the first range of the cell phone;
selecting at least one of a plurality of audio messages stored in a computer memory of the cell phone, and
playing the at least one of the plurality of audio messages stored in the computer memory of the cell phone through an audio speaker of the cell phone.

10. The method of claim 9 wherein
the cell phone comprises:
a computer processor;
the computer memory of the cell phone which is in communication with the computer processor of the cell phone through a communications link;
a device for detecting the dashboard apparatus within the first range of the cell phone, wherein the device for detecting the dashboard apparatus is in communication with the computer processor of the cell phone through a communications link;
and an audio speaker in communication with the computer processor of the cell phone through a communications links; and
wherein the computer memory of the cell phone includes computer software implemented by the computer processor of the cell phone to receive one or more signals from the device for detecting the dashboard apparatus, and to select based on the one or more signals from the device for detecting the dashboard apparatus the at least one of a plurality of audio messages stored in the computer memory of the cell phone, and to play the at least one of the plurality of audio messages stored in computer memory of the cell phone through the audio speaker of the cell phone.

11. The method of claim 7
wherein the device for detecting the cell phone includes a camera.

12. The method of claim 9
wherein the device for detecting the dashboard apparatus includes a camera.

13. The method of claim 7
wherein the device for detecting the cell phone includes a scanner.

14. The method of claim 9
wherein the device for detecting the dashboard apparatus includes a scanner.

* * * * *